Dec. 31, 1968  R. C. BUELER  3,419,315
CONTROL VALVE
Filed Dec. 30, 1966

INVENTOR
RICHARD C. BUELER
BY
Joseph E. Papin

United States Patent Office 3,419,315
Patented Dec. 31, 1968

3,419,315
CONTROL VALVE
Richard C. Bueler, Glendale, Mo., assignor to Wagner Electric Corporation, Newark, N.J., a corporation of Delaware
Filed Dec. 30, 1966, Ser. No. 606,143
12 Claims. (Cl. 303—71)

ABSTRACT OF THE DISCLOSURE

A control valve for normally effecting the application of fluid pressure supplied thereto to the emergency chamber of a spring set brake cylinder and also responsive to a control fluid pressure metered thereto for isolating the supplied fluid pressure and effecting a metered reduction of the applied fluid pressure.

---

Figure 2:
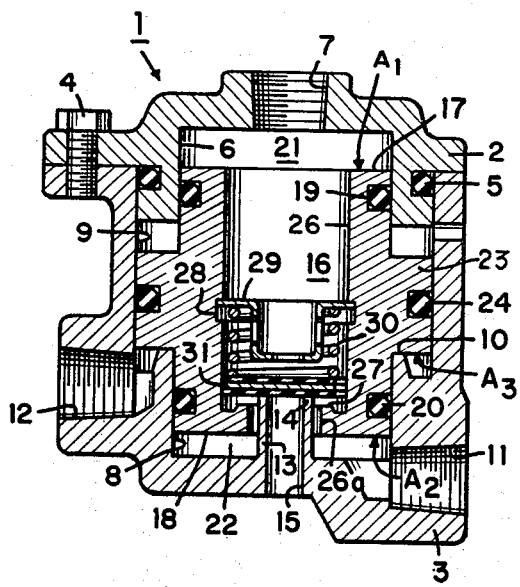

This invention relates to control valves for spring set brake systems and in particular to those control valves for effecting emergency energization of said spring set brake systems.

In the past spring set brake systems for a vehicle or the like, an application valve was operable to selectively apply service fluid pressure from a source thereof to a spring set brake cylinder to actuate a fluid pressure responsive service member thereof which, in turn, energized a brake device operatively connected with said spring set brake cylinder. The spring set brake cylinder was also provided with an emergency or resiliently urged member responsive to emergency fluid pressure less than a predetermined value supplied thereto from another or an emergency fluid pressure source to drivingly actuate and mechanically effect emergency energization of the brake device. In order to manually actuate the emergency member, a push-pull valve of a type well known to the art was provided in the vehicle for operator actuation and manually movable between a charging position for supplying emergency fluid pressure to the resiliently urged member and another exhaust position for venting or dumping the fluid pressure supplied to said resiliently urged member to the atmosphere, thereby mechanically effecting emergency energization of the brake device. One of the disadvantageous or undesirable features of such past spring set brake systems was the lack of control over the emergency energization of the brake device. In other words, the extent of intensity of the emergency energization of the brake device depended upon the extent of the depletion of the emergency fluid pressure below the predetermined value. For instance, if the emergency fluid pressure was depleted down to the predetermined value due to slow leaks or the like in the system, the emeregncy energization of the brake device was rather gradual and of rather light intensity on the order of brake drag conditions; however, if the emergency fluid pressure was completely depleted due to a conduit rupture or the like, the emergency energization of the brake device was immediate and very intense. In the event of the aforementioned gradual reduction of the emergency fluid pressure and the accompanying rather light emergency energization of the brake device, it was often the case that the operator was unaware of such drag condition or light emergency energization of said brake device and continued to operate his vehicle under the assumption that full tank pressure was available for normal service braking. Further, in the event of the aforementioned complete dissipation of the emergency fluid pressure along with the accompanying immediate and very intense emergency energization of the brake device, the operator's control over the vehicle was greatly impaired, and in some instances, such as when operating the vehicle on slippery or undesirable roadways, such immediate and very intense emergency energization of the brake device might obviate the operator's control over the vehicle. In addition to the above, another disadvantageous or undesirable feature of such past spring set brake systems was the lack of ability for the operator to effect a manually controlled or metered dissipation of the emergency fluid pressure to provide controlled emergency or mechanical energization of the brake device. In other words, operator actuation of the aforementioned push-pull valve dumped the fluid pressure supplied to the resiliently urged member to atmosphere, thereby effecting an immediate and very intense mechanical energization of the brake device. Of course, such immediate and intense energization of the brake device also greatly affected the control of the operator over the vehicle and in some instances, such as on slippery or undesirable road conditions, might also completely obviate the operator's control over the vehicle. And yet another disadvantageous or undesirable feature of such past fluid pressure systems was that the push-pull valve was necessarily located in the vehicle adjacent to the driver; therefore, the fluid pressure exhausted from the resiliently urged member to effect emergency energization of the brake device necessarily travelled from the spring set brake cylinder located adjacent to the brake back to the push-pull valve located near the operator, and this flow of the exhausted fluid pressure effected an unnecessary time delay in brake device energization under emergency conditions.

The principal object of the present invention is to provide a novel control valve for use in a spring set brake system which obviates the aforementioned undesirable and disadvantageous features, and this and other objects and advantageous features for the present invention will become apparent hereinafter.

Briefly, the invention embodies a control valve having application means responsive to fluid pressure supplied thereto for effecting the application of said supplied fluid pressure therethrough, said application means also being responsive to control fluid pressure selectively metered thereto to isolate the supplied fluid pressure from the applied fluid pressure and effect a metered reduction of the applied fluid pressure. The invention also embodies resiliently urged means movable in response to fluid pressure supplied thereto less than a predetermined value for reducing the applied fluid pressure.

Figure 3:
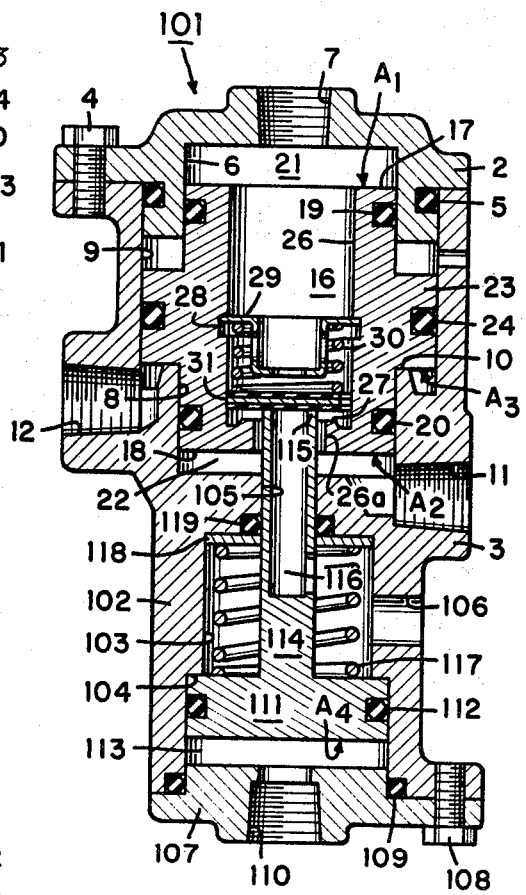
Figure 1:
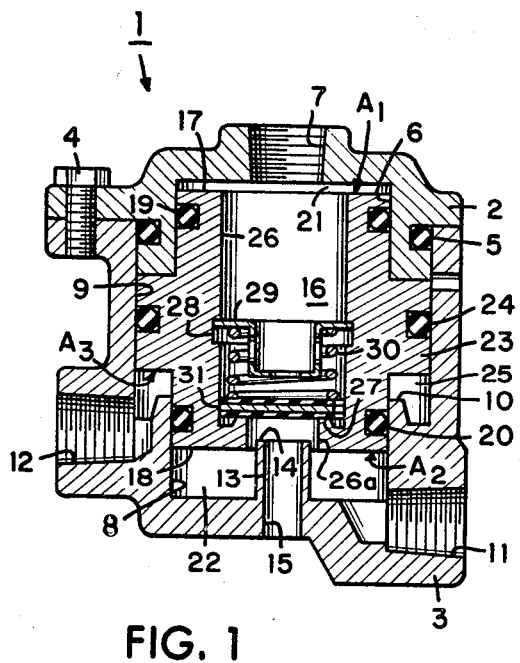

In the drawings, wherein like numerals refer to like parts wherever they occur,

FIG. 1 is a sectional view showing a control valve embodying the present invention in cross-section, FIG. 2 is a sectional view showing the control valve of FIG. 1 in an applied position in cross-section, and FIG. 3 is also a sectional view showing another control valve embodying the present invention in cross-section.

Referring now to FIGS. 1 and 2 in detail, a control or inversion valve 1 is provided with upper and lower housings 2, 3 interconnected by suitable means, such as studs 4, and a seal 5 is sealably engaged between said housings. The upper housing 2 is provided with an axial bore 6, and the upper end thereof is intersected by an inlet port 7, said inlet port being connected with a push-pull valve (not shown) of the type well known in the art and selectively movable between a charging position for subjecting said inlet port to a fluid pressure source and a venting position for exhausting said inlet port to the atmosphere. The lower housing 3 is provided with a bore and counterbore 8, 9 in axial alignment with the upper housing bore 6, and a recessed annular shoulder 10 is provided at the juncture of said bore and counterbore 8, 9. The lower housing 3 is also provided with an outlet port 11 for connection with the emergency chamber of a spring set brake cylinder, such as that disclosed in United States Patent No. 3,152,521 issued Oct. 13, 1964, to Oliver B. Cruse, and intersecting the bore 8 adjacent to the lower end thereof, and a control port 12 is also provided in said housing intersecting the counterbore 9 adjacent to the lower end thereof, said control port being adapted to receive a control fluid pressure metered thereto from an application valve, or the like (not shown). A hub 13 is integrally formed with the lower housing 3 extending coaxially into the bore 8 and having a free end thereon defining an exhaust valve seat 14, and an exhaust passage or port 15 extends coaxially through said valve seat and hub portion to vent the outlet port 11 to the atmosphere.

An application member or piston, indicated generally at 16, is provided with upper and lower ends 17, 18 which are slidably received in the upper and lower housing bores 6, 8, respectively, and peripheral seals 19, 20 are carried adjacent to said upper and lower piston ends for sealing engagement with said upper and lower housing bores, respectively. The piston upper end 17 is provided with an effective cross-sectional area $A_1$ and defines with the upper bore 6 an expansible inlet chamber 21 in open pressure fluid communication with the inlet port 7, and the lower piston end 18 is provided with an effective cross-sectional area $A_2$ substantially equal and opposed to the area $A_1$ and defining with the lower housing bore 8 an expansible outlet chamber 22 in open pressure fluid communication with the outlet port 11. The piston 16 is also provided with an intermediate portion or peripheral flange 23 having a peripheral seal 24 therein in sealing engagement with the lower housing counterbore 9. An expansible fluid pressure control chamber 25 is defined in the housing counterbore 9 between the piston flange 23 and housing shoulder 10 in open pressure fluid communication with the control port 12. Another effective cross-sectional area $A_3$ is provided in the piston 16 for subjection to control fluid pressure in said control chamber, said area $A_3$ being opposed to the area $A_1$ and additive to the area $A_2$.

A fluid pressure application passage or stepped bores 26, 26a is axially provided through the piston 16 between the upper and lower ends 17, 18 thereof, and an annular valve seat 27 is defined on said piston at the juncture of said stepped bores. The larger stepped bore 26 is undercut at 28 to receive a split ring type, spring retainer assembly 29, and a valve spring 30 is biased between said retainer and a valve element 31 normally urging said seat valve element into sealing engagement with the valve seat 27 to interrupt pressure fluid communication between the inlet and outlet ports 7, 11. It should be noted that the lower housing hub portion 13 is provided in spaced coaxial relationship with the piston smaller stepped bore 26a to position the exhaust valve seat 14 for engagement with the valve element 31. Of course, a return spring may be biased between the piston lower end 18 and the lower end wall of the lower housing bore 8, if desired.

In the operation, when the inlet port and chamber 7, 21 are subjected to fluid pressure supplied thereto, said supplied or input fluid pressure acts on the effective area $A_1$ of the piston 16 to establish an input force $Fi$ urging said piston downwardly toward its applied or pressure fluid flow passing position, as shown in FIG. 2. The downward movement of the piston 16 in response to the input force $Fi$ initially sealably engages the valve element 31 with the exhaust valve seat 14 to close exhaust port 15 interrupting pressure fluid communication thereof with the outlet port 11, and further downward movement of said piston thereafter disengages the piston valve seat 27 from said valve element to open the application passages 26, 26a and effect the application of the supplied fluid pressure therethrough from the inlet chamber 21 to the outlet chamber and port 22, 11. The downward movement of the piston 16 is, of course, predeterminately limited upon the engagement of the piston peripheral flange 24 with the housing shoulder 10. Since the applied fluid pressure so established in the outlet chamber 22 is substantially equal to that in the inlet chamber 21 and since the input and output effective areas $A_1$, $A_2$ are substantially equal, an output force $Fo$ is created which is in opposition to and substantially equal to the input force $Fi$; therefore, the input and output forces $Fi$ and $Fo$ are self-cancelling, and the piston 16 will remain in its applied position.

In the event it is desirable to effect a metered reduction of the applied fluid pressure at the outlet port 11, control fluid pressure is selectively metered to the control port and chamber 12, 25 acting on the control area $A_3$ to establish a control force $Fc$ in opposition to the input force $Fi$ and additive to the output force $Fo$. Since the input and output forces are substantially balanced, the control force $Fc$ is effective to move the piston 16 upwardly to sealably re-engage the piston valve seat 27 with the valve element 31 and thereafter move said valve element to a position disengaged from the exhaust valve seat 14. In this manner, pressure fluid communication between the inlet and outlet ports 7, 11 is again interrupted isolating the supplied fluid pressure in the inlet chamber 21 from the applied fluid pressure in the outlet chamber 22, and pressure fluid communication between the outlet and exhaust ports 11, 15 is re-established to meter the applied fluid pressure to the atmosphere. Of course, the metered reduction of the applied fluid pressure at the outlet port 11 effects a corresponding reduction of the output force $Fo$; therefore, when the magnitude of the reduced output force $Fo$ and the additive control force $Fc$ becomes substantially equal to the input force $Fi$, the piston 16 is moved downwardly toward a lapped position wherein the valve element 31 is in lapped engagement with the piston valve seat 27 and the exhaust valve seat 14. In the event a more intense metered reduction of the applied fluid pressure at the outlet port 11 is desired, the intensity of the control fluid pressure metered to the control port and chamber 12, 25 of the control valve 1 is increased, thereby increasing the control force $Fc$, and the piston 16 reacts to the increased control force $Fc$ to further effect metered dissipation of the applied fluid pressure at the outlet port 11, as previously described.

When it is desirable to re-establish the magnitude of the applied fluid pressure at the outlet port 11, the control fluid pressure at the control port 12 is exhausted, thereby eliminating the control force $Fc$. Upon the elimination of the control force $Fc$, the magnitude of the input force $Fi$ is greater than that of the reduced output force $Fo$; therefore, the differential between the input and output forces $Fi$, $Fo$ is effective to move the piston 16 downwardly toward its applied position to again disengage the piston valve seat 27 from the valve element 31 to open the flow passage 26, 26a and re-establish open pressure fluid communication between the inlet and outlet ports 7, 11. In this manner, the applied fluid pressure at the outlet port 11 again becomes substantially equal to the supplied fluid pressure at the inlet port 7, and the input and output forces $Fi$, $Fo$ are once again substantially balanced.

The control valve 1 can be "dynamited" by exhausting the supplied fluid pressure at the inlet port 7, thereby eliminating the input force $Fi$, and the output force $Fo$ is thereafter effective to move the piston 16 upwardly into abutment with the upper housing 2, wherein the valve element 31 is disengaged from the exhaust valve seat 14. In this manner, pressure fluid communication is established between the outlet and exhaust ports 11, 15 to dump the applied fluid pressure to the atmosphere thus eliminating the output force $Fo$.

Referring now to FIG. 3, another control or inversion valve 101 is shown having substantially the same component parts and functioning in substantially the same manner as the previously described control valve 1 with the following exceptions.

The control valve 101 is provided with a housing extension 102 integrally formed on the lower end of the housing 3. The housing extension 102 is provided with a stepped counterbore 103 defining an annular shoulder 104 therein, and a bore 105 is also provided in said housing extension having one end intersecting with the lower end wall of the housing bore 8 and the other end thereof intersecting with the upper end wall of the stepped counterbore 103. An exhaust port 106 is provided through the housing extension 102 intersecting the stepped counterbore 103 adjacent to the upper end thereof, and a closure or end member 107 is fixedly connected with said housing extension at the lower end thereof by suitable means, such as a plurality of studs 108, to close the lower end of said stepped counterbore, said closure member and housing extension having a seal 109 interposed therebetween. A parking or control port 110 is provided in the closure member 107 for selective connection with the atmosphere or the fluid pressure source to which the inlet port 7 is connected through a push-pull valve (not shown) of a type well known to the art.

An exhaust piston 111 is slidably received in the housing extension counterbore 103 between the shoulder 104 and closure member 107 and is provided with a peripheral seal 112 in sealing engagement with said housing extension counterbore, said exhaust piston defining an expansible fluid pressure parking or control chamber 113 in said housing extension counterbore in open pressure fluid communication with the parking port 110. It should be noted that the piston 111 is provided with an effective cross-sectional area $A_4$ responsive to fluid pressure in the chamber 113. The piston 111 is also provided with a stem portion or tubular extension 114 which is slidably received in the housing extension bore 105, and the upper or free end of said extension extends coaxially with the outlet chamber 22 defining an exhaust valve seat 115 for sealing engagement with the valve element 31. An exhaust passage 116 is axially provided in the extension 114 having one end extending through the exhaust valve seat 115 and the other end thereof connected in open pressure fluid communication with the exhaust port 106 through the counterbore 103. To complete the description of the control valve 101, a pre-compressed emergency spring 117 is biased between the piston 111 and a retainer 118 normally urging said piston in a direction to oppose fluid pressure expansion of the chamber 113 and normally urging the retainer into engagement with the housing extension 102, and a seal 119 is provided in sealing engagement between the extension housing bore 105 and the exhaust stem 114 being retained against displacement by said retainer.

In the operation of the control valve 101 when the parking port and chamber 110, 113 are selectively subjected to the supplied fluid pressure having a magnitude in excess of a predetermined value, said supplied fluid pressure acts on the effective area $A_4$ of the piston 111 creating a holding force $Fh$ in opposition to the pre-compressive force of the spring 117. When the magnitude of the holding force $Fh$ is greater than the pre-compressive force of the spring 117, the piston 111 is moved upwardly into engagement with the shoulder 104, and this upward movement also moves the stem 114 upwardly wherein the exhaust valve seat 115 is predeterminately positioned in the outlet chamber 22 for operative engagement with the valve element 31. As long as the magnitude of the supplied fluid pressure in the parking chamber 113 exceeds the predetermined value, the holding force $Fh$ will maintain the piston and valve stem 11, 114 in their operative positions against the pre-compressive force of the spring 117, and the component parts of the control valve 101 will function in the same manner as described hereinbefore for the control valve 1.

In the event the magnitude of the supplied fluid pressure is reduced to a value less than the predetermined value due to leaks or the like, the holding force $Fh$ is correspondingly reduced, and the pre-compressive force of the spring 117 moves the piston 111 downwardly toward its venting position in abutment with the closure member 107. This downward movement also displaces the stem valve seat 115 downwardly toward a position disengaged from the valve element 31 automatically effecting pressure fluid communication between the outlet and exhaust ports 11, 106 to exhaust the applied fluid pressure from the outlet chamber 22 through the stem exhaust passage 116, the extension housing counterbore 103 and said exhaust port to the atmosphere. In this manner, the output force $Fo$ acting on the piston 16 is eliminated, wherein the input force $Fi$ urges the piston flange 23 into movement limiting engagement with the housing shoulder 10 which prevents the re-engagement of the valve element with the displaced exhaust valve seat 115. Of course, when the magnitude of the supplied fluid pressure is re-established in the chamber 113 to a value in excess of the predetermined value, the piston 111 is moved upwardly toward its operative position. This upward movement initially sealably engages the stem exhaust valve seat 115 with the valve element 31 to interrupt pressure fluid communication between the outlet and exhaust ports 11, 106 and then moves said valve element to a position disengaged from the piston valve seat 27 to re-establish pressure fluid communication between the inlet and outlet ports 7, 11 and again effect the application of the supplied fluid pressure through the piston flow passage 26, 26a into the outlet chamber and port 22, 11.

The embodiments of the invention is which an exclusive property or privilege is claimed are defined as follows:

1. A control valve comprising a housing having inlet, outlet and control ports therein, a valve control member movable in said housing including valve means therein for controlling pressure fluid communication between said inlet and outlet ports, said valve control member being responsive to fluid pressure at said inlet port to move said valve means toward a position establishing pressure fluid communication between said inlet and outlet ports and also being responsive to metered fluid pressure at said control port to move said valve means toward another position in said housing interrupting pressure fluid communication between said inlet and outlet ports and metering the established fluid pressure at said outlet port to the atmosphere to reduce the magnitude thereof in a ratio proportional with that of the metered fluid pressure at said control port, a flow passage in said valve control member between said inlet and outlet ports, a valve seat on said valve control member in circumscribing relation with said flow passage, said valve means being urged into engagement with said valve seat to interrupt pressure fluid communication between said inlet and outlet ports, other means in said housing defining exhaust passage means for venting said outlet port to the atmosphere including an exhaust valve seat in circumscribing relation with said exhaust passage means, said valve control member being movable in response to fluid pressure at said inlet port to initially engage said valve means with said exhaust valve seat closing said exhaust passage means and thereafter disengaging said first named valve seat from said valve means to open said flow passage and establish pressure fluid communication between said inlet and outlet port, and said valve control member also being responsive to the metered fluid pressure at said control port to re-engage said first named valve seat with said valve means and thereafter disengage said valve means from said exhaust valve seat to meter the established fluid pressure to the atmosphere through said exhaust passage means.

2. The control valve according to claim 1, comprising expansible fluid pressure chamber in said housing, said other means including resiliently urged means movable in said housing and opposing fluid pressure expansion of said chamber, said exhaust valve seat being on said resiliently urged means and said exhaust passage means being in said resiliently urged means, said resiliently urged means being movable in response to fluid pressure in said chamber less than a predetermined value toward a position disengaging said exhaust valve seat from said valve means to open said exhaust passage means and vent the established fluid pressure at said outlet port to the atmosphere.

3. The control valve according to claim 2, wherein said resiliently urged means includes a piston member movable in said housing and defining a wall of said chamber, a stem having one end connected with said piston member and the other end thereof defining said exhaust valve seat, said exhaust passage means extending through said stem, and resilient means urging said piston member against fluid pressure expansion of said chamber.

4. The control valve according to claim 3, wherein said resilient means comprises a pre-compressed spring engaged between said piston member and said housing.

5. A control valve comprising a housing having inlet, outlet and control ports therein, a valve control member movable in said housing including valve means therein for controlling pressure fluid communication between said inlet and outlet ports, said valve control member being responsive to fluid pressure at said inlet port to move said valve means toward a position establishing pressure fluid communication between said inlet and outlet ports and also being responsive to metered fluid pressure at said control port to move said valve means toward another position in said housing interrupting pressure fluid communication between said inlet and outlet ports and metering the established fluid pressure at said outlet port to the atmosphere to reduce the magnitude thereof in a ratio proportional with that of the metered fluid pressure at said control port, a counterbore in said housing between a pair of bores, said valve control member having opposed ends slidable in said bores and an intermediate portion slidable in said counterbore, said inlet port being connected with the other of said bores, opposed substantially equal areas on said ends respectively responsive to fluid pressure at said inlet and outlet ports, a control area on said intermediate portion responsive to the metered fluid pressure at said control port, said control area being opposed to one of said end areas subjected to fluid pressure at said inlet port and additive to the other of said end areas subjected to fluid pressure at said outlet port, a stepped bore extending through said valve control member between the opposed ends thereof, a valve seat defined on said valve control member at the juncture of said stepped bores, said valve means being urged into engagement with said valve seat to interrupt pressure fluid communication between said inlet and outlet port, a pair of stepped bores in said housing connected with said other housing bore, a stepped exhaust piston slidable in said housing stepped bores and having a free end portion extending into said housing other bore defining an exhaust valve seat for engagement with said valve means, an exhaust port in said housing, exhaust passage means in said exhaust piston having one end extending through said exhaust valve seat and the other end thereof connected in communication with said exhaust port, said stepped exhaust piston being movable against said spring means in response to fluid pressure in said chamber in excess of a predetermined value to move said exhaust valve seat toward an operative position for engagement with said valve means, said valve control member being initially movable in response to fluid pressure at said inlet port acting on said one end area to engage said valve means with said exhaust valve seat in its operative position closing said exhaust passage means and isolating said outlet port from said exhaust port and being thereafter further movable relative to said valve means to disengage said first named valve seat from said valve means and establish pressure fluid communication between said inlet and outlet ports, said valve control member also being movable in response to metered fluid pressure at said control port acting on said control area toward a metering position to re-engage said first named valve seat with said valve means and disengage said valve means from said exhaust valve seat to effect a metered reduction of the established fluid pressure at said outlet port through said exhaust passage means to said exhaust port, and said spring means being effective to urge said exhaust piston toward a venting position when the fluid pressure in said chamber is reduced to a value less than the predetermined value to completely disengage said exhaust valve seat from said valve means and establish open pressure fluid communication between said outlet and exhaust ports.

6. A control valve comprising a housing having inlet and outlet ports therein, a valve control member movable in said housing, passage means in said valve control member for connection in pressure fluid communication between said inlet and outlet ports, valve means in said valve control member and movable within said passage means for controlling pressure fluid communication between said inlet and outlet ports, other means in said housing defining an exhaust passage for venting said outlet port to the atmosphere including a valve seat about said exhaust passage for engagement with said valve means, said valve control member being initially movable in response to fluid pressure at said inlet port to engage said valve means with said valve seat closing said exhaust passage and said valve control member being thereafter further movable relative to said valve means toward a position disengaged therefrom to open said passage means and establish pressure fluid communication between said inlet and outlet ports, and a control port in said housing for selective subjection to metered fluid pressure, said valve control means also being movable in response to metered fluid pressure at said control port to re-engage said valve means closing said passage means and thereafter move said valve means toward a venting position disengaged from said valve seat to meter the established fluid pressure at said outlet port to the atmosphere through said exhaust passage and reduce the magnitude thereof in a ratio proportional to the magnitude of the metered fluid pressure at said control port.

7. The control valve according to claim 6, comprising opposed end portions on said valve control member defining with said housing opposed inlet and outlet chambers respectively connected with said inlet and outlet ports, said passage means being connected between said opposed end portions, a pair of opposed effective areas on said opposed end portions for subjection to the fluid pressures in said inlet and outlet chambers, respectively, said valve control member being movable in response to the fluid pressure in said inlet chamber acting on one of said opposed areas toward its position establishing pressure fluid communication between said inlet and outlet ports and the established fluid pressure in said outlet chamber acting on the other of said opposed areas, flange means on said valve control member between said opposed end portions and defining with said housing a control chamber connected with said control port, and a third effective area on said flange means for subjection to the metered fluid pressure in said control chamber and additive to said other opposed area, said valve control member being movable against the fluid pressure in said inlet chamber acting on said one opposed area in response to the metered fluid pressure in said control chamber acting on said third area and the established fluid pressure in said outlet chamber acting on said other opposed area to meter the established fluid pressure at said outlet port to the atmosphere.

8. The control valve according to claim 7, comprising another fluid pressure chamber in said housing, said other means including resiliently urged means extending into said outlet chamber and movable in said housing to define therewith said other chamber, said exhaust valve seat being on said resiliently urged means in said outlet chamber and said exhaust passage means being in said resiliently urged means, said resiliently urged means being movable in response to fluid pressure in said other chamber less than a predetermined value toward a position disengaging said exhaust valve seat from said valve means to open said exhaust passage means and vent the established fluid pressure in said outlet chamber to the atmosphere.

9. The control valve according to claim 8, wherein said resiliently urged means includes piston means movable in said housing and defining a wall of said other chamber, a stem having one end connected with said piston means and the other end thereof extending into said outlet chamber, said exhaust valve seat being on said other end of said stem and said exhaust passage means being in said stem, a fourth effective area on said piston means and subjected to the fluid pressure in said chamber, and resilient means opposing movement of said piston means in response to the fluid pressure in said other chamber acting on said fourth area.

10. The control valve according to claim 9, wherein said resilient means comprises pre-compressed spring means engaged between said housing and said piston means.

11. The control valve according to claim 7, comprising a pair of stepped counterbores in said housing, a bore in said housing connected between said outlet chamber and one of said stepped counterbores, an abutment on said housing at the juncture of said stepped counterbores, another control port in said housing connected with the other of said stepped counterbores and adapted for selective subjection to fluid pressure, an exhaust port in said housing connected with said one stepped counterbore, and said other means including a piston slidable in said other stepped counterbore, a fourth effective area on said piston for subjection to fluid pressure at said other control port, a stem slidable in said bore having one end connected with said piston and the other end thereof extending into said outlet chamber, said exhaust valve seat being defined on said other end of said stem, said exhaust passage means being in said stem having one end extending through said exhaust valve seat and the other end thereof in communication with said exhaust port, and a spring in said one stepped counterbore biased between said housing and said piston, said piston being movable against said spring into engagement with said abutment in response to fluid pressure at said other control port acting on said fourth area when said control port is selectively subjected to fluid pressure to concertedly move said exhaust valve seat toward an operative position for engagement with said valve means, and said spring being effective to urge said piston and stem toward a venting position when the fluid pressure at said other control port is reduced to a value less than a predetermined value to completely disengage said exhaust valve seat from said valve means and establish open pressure fluid communication through said exhaust passage means between said outlet and exhaust ports.

12. The control valve according to claim 6, comprising a counterbore in said housing connected between a pair of opposed bores, said valve control member including a piston having opposed end portions respectively slidable in said opposed bores and an intermediate portion slidable in said counterbore, said inlet and outlet ports being connected with said opposed bores, respectively, opposed substantially equal areas on said end portions respectively responsive to fluid pressure at said inlet and outlet ports, said passage means including a pair of stepped bores extending through said piston between said opposed end portions thereof, and another valve seat defined on said piston at the juncture of said pair of stepped bores, said valve means being normally urged into engagement with said other valve seat to interrupt pressure fluid communication between said inlet and outlet ports, said piston being initially movable in response to fluid pressure at said inlet port acting on one of said areas to engage said valve means with said exhaust valve seat closing said exhaust passage means and being thereafter further movable relative to said valve means to disengage said other valve seat therefrom and establish the pressure fluid communication between said inlet and outlet ports, the established fluid pressure at said outlet port acting on the other of said areas, and a control area on said intermediate portion for subjection to the metered fluid pressure at said control port and additive to said other area, said piston also being movable in response to the metered fluid pressure at said control port acting on said control area toward a metering position to re-engage said other valve seat with said valve means and disengage said valve means from said exhaust valve seat to effect the metered reduction of the established fluid pressure at said outlet port through said exhaust passage means.

References Cited

UNITED STATES PATENTS 3,188,916    6/1965    Beatty.
1,912,447    6/1933    Gray.
3,291,153   12/1966    Chabrier _____ 137—625.66 XR MILTON BUCHLER, *Primary Examiner.*

J. J. McCLAUGHLIN, *Assistant Examiner.*

U.S. Cl. X.R.

137—596.18, 627.5; 303—30, 40, 54